United States Patent
Singh et al.

(10) Patent No.: US 12,236,182 B2
(45) Date of Patent: Feb. 25, 2025

(54) MULTI-PARAMETER, RULE-BASED USER EXPERIENCE VARIANTS IN CLOUD APPLICATION

(71) Applicant: SAP SE, Walldorf (DE)

(72) Inventors: Pradeep Kumar Singh, Bengaluru (IN); Adithya Uday, Bangalore (IN); Sreekanth K, Kottayam (IN); Jens Rohde, Heppenheim (DE); Ravi Chandra Chandra Kss, Bangalore (IN); Anilkumar Bairi, Wiesloch (DE)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 17/956,505

(22) Filed: Sep. 29, 2022

(65) Prior Publication Data

US 2024/0111939 A1 Apr. 4, 2024

(51) Int. Cl.
*G06F 17/00* (2019.01)
*G06F 40/106* (2020.01)
*G06Q 10/10* (2023.01)

(52) U.S. Cl.
CPC ......... *G06F 40/106* (2020.01); *G06Q 10/103* (2013.01)

(58) Field of Classification Search
CPC . G06F 40/106; G06F 8/30; G06F 8/38; G06F 40/30; G06F 16/338; G06F 40/103; G06F 16/345; G06F 40/166; G06F 16/958; G06F 16/93; G06F 3/0484; G06F 40/197; G06F 16/9577; G06F 16/909; G06Q 10/103

USPC ......................................................... 715/744
See application file for complete search history.

(56) References Cited

U.S. PATENT DOCUMENTS

| | | | |
|---|---|---|---|
| 2011/0197263 A1* | 8/2011 | Stinson, III | G06F 3/017 715/753 |
| 2016/0092091 A1* | 3/2016 | Hanson | G06F 3/04886 715/763 |
| 2017/0131975 A1* | 5/2017 | Balasubramanian | G06F 8/30 |
| 2020/0019643 A1* | 1/2020 | Roy | G06F 40/30 |

* cited by examiner

*Primary Examiner* — Jason T Edwards
(74) *Attorney, Agent, or Firm* — Buckley, Maschoff & Talwalkar LLC

(57) ABSTRACT

A user experience repository may contain base layouts and variant metadata for applications of an enterprise. An application design platform may receive, from a designer, an indication of a selected base layout for a selected application and interact with the designer to create a user experience variant (e.g., a page layout). The designer may then define an assignment rule for the user experience variant, the assignment rule including custom logic and multiple user parameters (e.g., a user role, country, language, etc.), and the system may store information about the user experience variant and assignment rule. An enterprise application service platform may determine that a user is accessing the selected application and evaluate the custom logic of the assignment rule based on user parameters of the user accessing the selected application. In accordance with the evaluation, the system may arrange to provide the appropriate user experience variant to the user.

21 Claims, 16 Drawing Sheets

MULTI-PARAMETER, RULE-BASED USER EXPERIENCE VARIANTS IN CLOUD APPLICATION

BACKGROUND

An enterprise may use cloud applications to perform business functions. For example, cloud-based applications are increasingly used to process purchase orders, handle human resources tasks, interact with customers, etc. These applications have user experience elements that may be customized. For example, an application may have a User Interface ("UI") layout define how and/or where menus, text boxes, icons, etc. appear. In some cases, the user experience elements may be tailored to a particular based on a business role (e.g., a manager might see a different page layout as compared to a customer service representative). Manually maintaining these customizations can be a time consuming and error prone task—especially when a substantial number of applications and/or customizations are involved. Moreover, provided increased flexibility in assigning customizations to users may let an enterprise more efficiently and effectively deploy cloud applications.

It would therefore be desirable to support multi-parameter, rule-based user experience variants for cloud application services in a secure, efficient, and accurate manner.

SUMMARY

Methods and systems may be associated with a system to support multi-parameter, rule-based user experience variants for cloud application services. A user experience repository may contain base layouts and variant metadata for applications of an enterprise. An application design platform may receive, from a designer, an indication of a selected base layout for a selected application and interact with the designer to create a user experience variant (e.g., a page layout). The designer may then define an assignment rule for the user experience variant, the assignment rule including custom logic and multiple user parameters (e.g., a user role, country, language, etc.), and the system may store information about the user experience variant and assignment rule. An enterprise application service platform may determine that a user is accessing the selected application and evaluate the custom logic of the assignment rule based on user parameters of the user accessing the selected application. In accordance with the evaluation, the system may arrange to provide the appropriate user experience variant to the user.

Some embodiments comprise: means for receiving, by a computer processor of an application design platform from a designer, an indication of a selected base layout for a selected application in a user experience repository that contains base layouts and variant metadata for applications of an enterprise; means for interacting with the designer to create a user experience variant of the selected base layout; means for defining, based on information received from the designer, an assignment rule for the user experience variant, the assignment rule including custom logic and multiple user parameters; means for storing information about the user experience variant and assignment rule; means for determining, by an enterprise application service platform, that a user is accessing the selected application; means for automatically evaluating the custom logic of the assignment rule for the selected application based on user parameters of the user accessing the selected application; and, in accordance with the evaluation, means for arranging to provide the appropriate user experience variant to the user.

Some technical advantages of some embodiments disclosed herein are improved systems and methods to support multi-parameter, rule-based user experience variants for cloud application services in a secure, efficient, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will now be described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
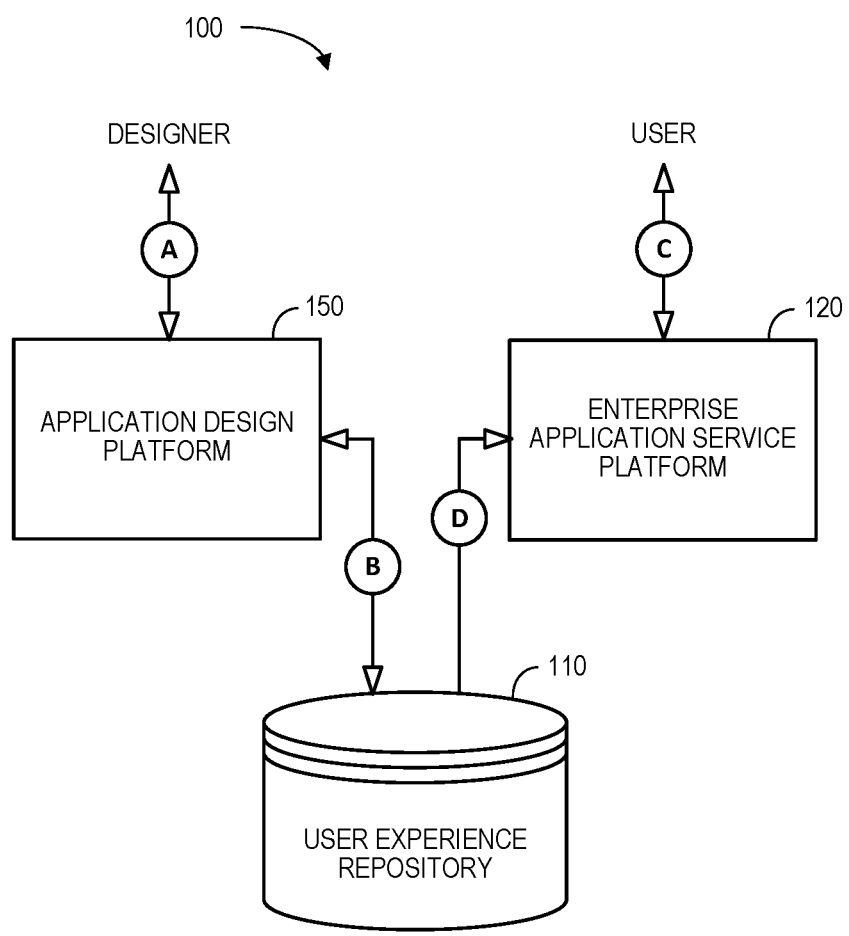
FIG. 1 is a high-level architecture for a system in accordance with some embodiments.

For example, FIG. 1 is a high-level block diagram of a system 100 according to some embodiments. At (A), a designer may interact with an application design platform 150. The designer might, for example, select a base layout for an application which can then be retrieved by the application design platform 150 from a user experience repository 110 at (B). The designer may also create user experience variants of the mast layout which can then be stored in the user experience repository 110. The designer can then create an assignment rule for each variant. The assignment rule might comprise, for example, custom logic associated with multiple user parameters that can also be stored in the user experience repository 110. When a user subsequently accesses the application via an enterprise service platform 120 at (C), information about the user can be automatically evaluated based on the assignment rules, and an appropriate user experience variance may be retrieved from the user experienced repository 110 at (D). A used herein, the term "automatically" may refer to a device or process that can operate with little or no human interaction.

According to some embodiments, devices, including those associated with the system 100 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores (e.g., the user experience repository 110), which may be locally stored or reside remote from the application design platform 150. Although a single application design platform 150 is shown in FIG. 1, any number of such devices may be included. Moreover, various devices described herein might be combined according to embodiments of the present invention. For example, in some embodiments, the application design platform 150 and the user experience repository 110 might comprise a single apparatus. Some or all of the system 100 functions may be performed by a constellation of networked apparatuses, such as in a distributed processing or cloud-based architecture.

An operator (e.g., a database administrator) may access the system 100 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various custom logic and/or mapping relationships) and/or provide or receive automatically generated recommendations, results, and/or alerts from the system 100. According to some embodiments, the operator may generate instructions to adjust custom logic (e.g., a page layout) or set thresholds that, when triggered, may manually or automatically result in interface customizations.

Figure 2:
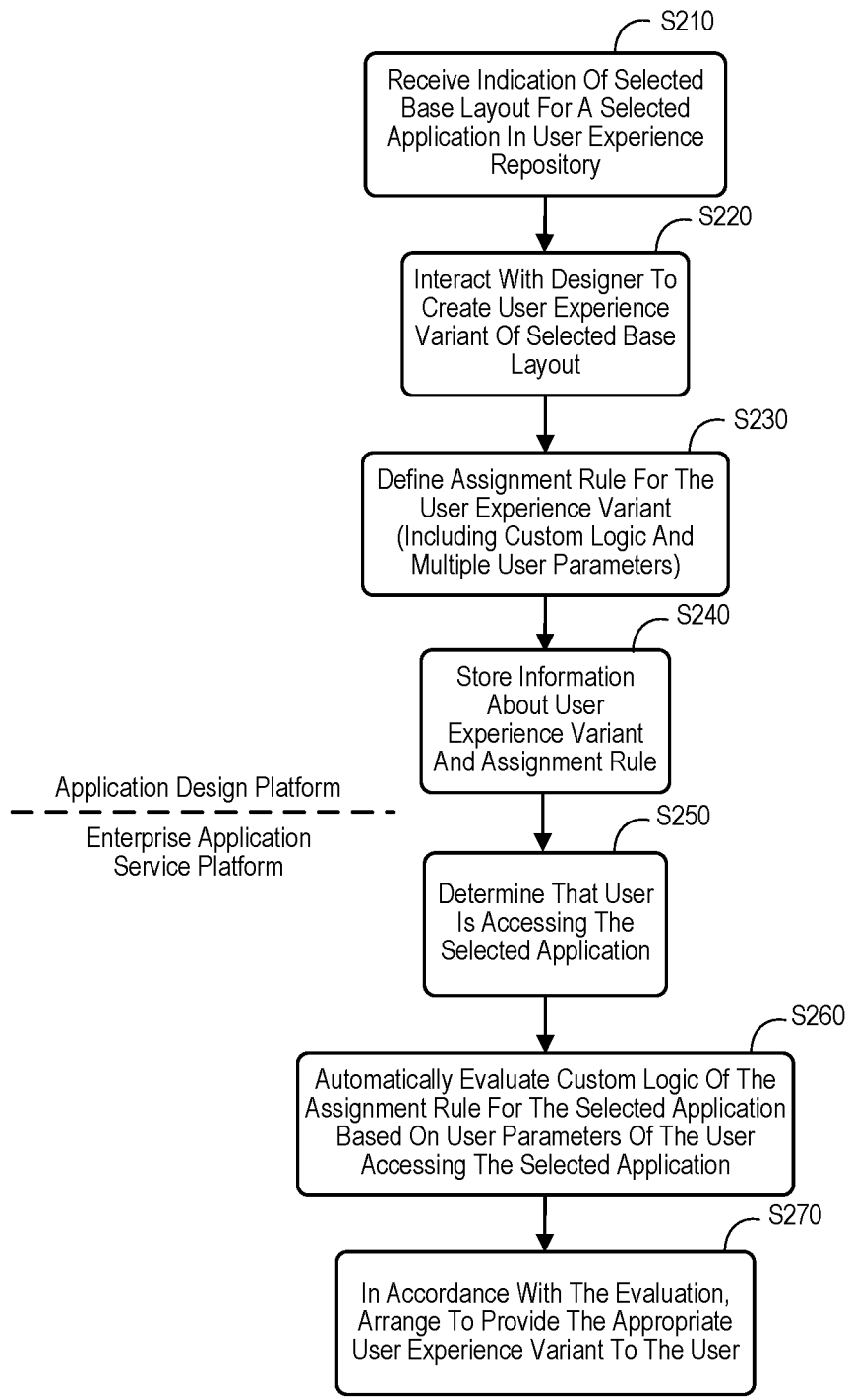
FIG. 2 illustrates a method according to some embodiments.

FIG. 2 illustrates a method to support multi-parameter, rule-based user experience variants for cloud application services in a secure, efficient, and accurate manner according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, an application design platform may receive, from a designer, an indication of a selected base layout for a selected application. The base layout may be retrieved, for example, from a user experience repository that contains base layouts and variant metadata for applications of an enterprise. At S220, the system may interact with the designer to create a user experience variant of the selected base layout. As used herein, the phrase "user experience" might refer to, for example, a page layout, an artifact, a field attribute, a UI icon, etc.

At S230, the system may define, based on information received from the designer, an assignment rule for the user experience variant. The assignment rule may include custom logic and multiple user parameters. As used herein, the phrase "user parameters" might refer to, for example, a user role, a user name, an enterprise department, a country, a region, a language, an organization hierarchy, an instance, etc. At S240, the system may store information about the user experience variant and assignment rule (e.g., in the user experience repository or other location).

At S250, an enterprise application service platform may determine that a user is accessing the selected application. The system may then automatically evaluate the custom logic of the assignment rule for the selected application at S260 based on user parameters of the user accessing the selected application. In accordance with the evaluation, the system may arrange to provide the appropriate user experience variant to the user at S270. According to some embodiments, multiple user experience variants may be associated with a base layout and/or multiple assignment rules may be assigned to a user experience variant.

Such an approach may help a customer customize a UI based on various parameters of the business user—such as a business role, country, geography, language or underlying object instance. Some embodiments may provide easy-to-use What You See Is What You Get ("WYSIWYG") tools so that an administrator can configure a screen layout according to the appropriate business need. Some embodiments may let customers create different screen variants ("page layouts") via an adaptation process that is performed in the same runtime WYSIWYG screen and these screen variants may be stored as metadata in a repository. An intuitive, flexible, and consistent mechanism for assigning these page layouts to end-users via assignment rules that are created via intuitive graphical user interface. That is, the screen variants may be assigned to one or more assignment rules which are evaluated at the start of the application (for user scope rules). Based on this, the relevant screen variant may be fetched from the repository and applied to the UI view. Some embodiments may let these screen variants can be cached on the browser or Content Delivery Network ("CDN") to minimize data transfer from server. Note that some embodiments may provide for multiple screen variants to be derived from a common base variant. For end-users, only one variant might be applied. If there are multiple variants, users may be given a choice as to which one they would prefer to use.

In this way, the assignment rules may provide an intuitive, flexible, and consistent mechanism for assigning all EXT/FLX artifacts (page layouts, field attributes, CLRs, etc.) to end-users. Using the assignment rules, a customer can customize the UI look and feel for different territories, departments, business roles, users, etc. Moreover, EXT/FLX artifacts might be assigned based on various user and underlying object instance properties, such as: employee/ user name, department, country, region, etc.; a sales or service organization and associated hierarchy; territories and territory hierarchy; business roles; etc.

Figure 3:
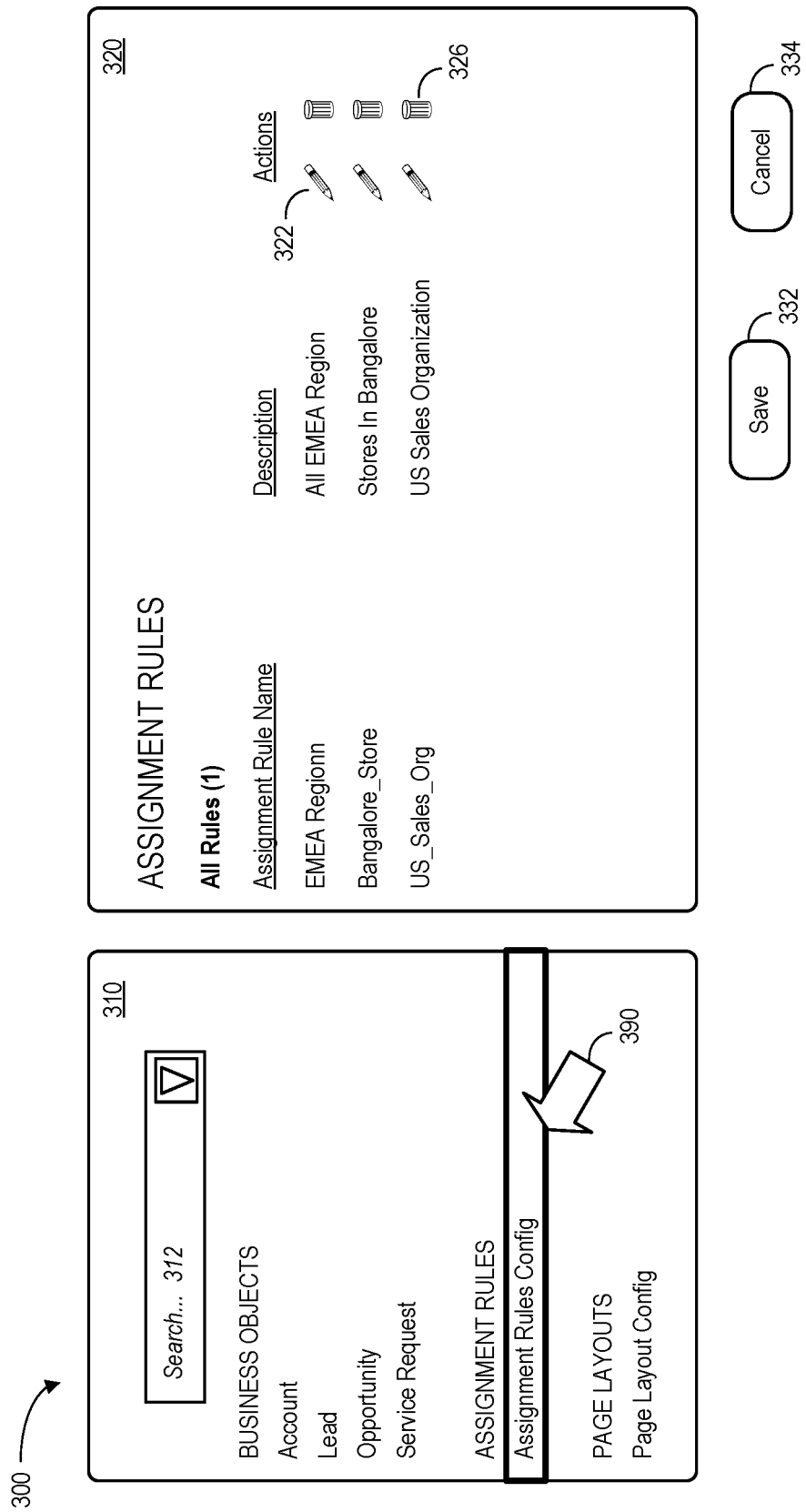
FIG. 3 is an assignment rule creation UI in accordance with some embodiments.

FIG. 3 is an assignment rule creation UI 300 in accordance with some embodiments. The UI 300 includes a display 310 that can be used to select or search 312 business objects, assignment rules, page layouts, etc. Selection of assignment rules (e.g., via touch screen or computer mouse pointer 390) may result in another display 320 that lists all of the assignment rules, including the rule name, description, and actions that might be performed (e.g., to edit 322 or delete 326 a rule) along with options for the designer to "Save" 332 or "Cancel" 334 the changes.

Figure 4:
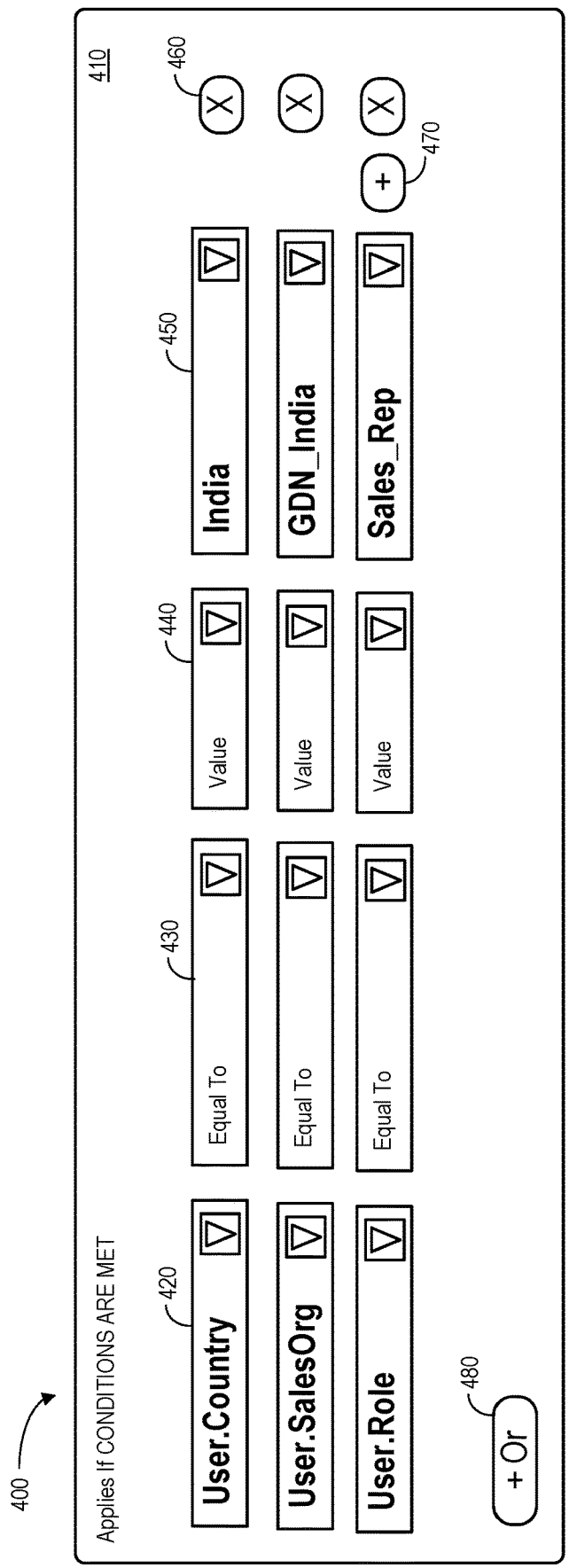
FIG. 4 is an assignment rule logic definition UI according to some embodiments.

When creating a user-based assignment rules, a designer may be given a condition building block to define custom logic and determinations. FIG. 4 is an assignment rule logic definition UI 400 according to some embodiments. The UI 400 includes a display 410 showing that the rule applies if all of multiple conditions are met. The conditions may include a user parameter 420 (e.g., user country, user region, user role, etc.) that must be "equal to" 430 (or not equal, greater than, etc.) a value 440 (or string) that meets a particular condition 450. The designer may remove 460 or add 470 conditions as needed. Moreover, multiple sets of conditions may be created 480. In this way, embodiments may provide global user context for the creation of assignment rules, such as user region, user country, user sales organization, user role, user language, etc.

Figure 5:
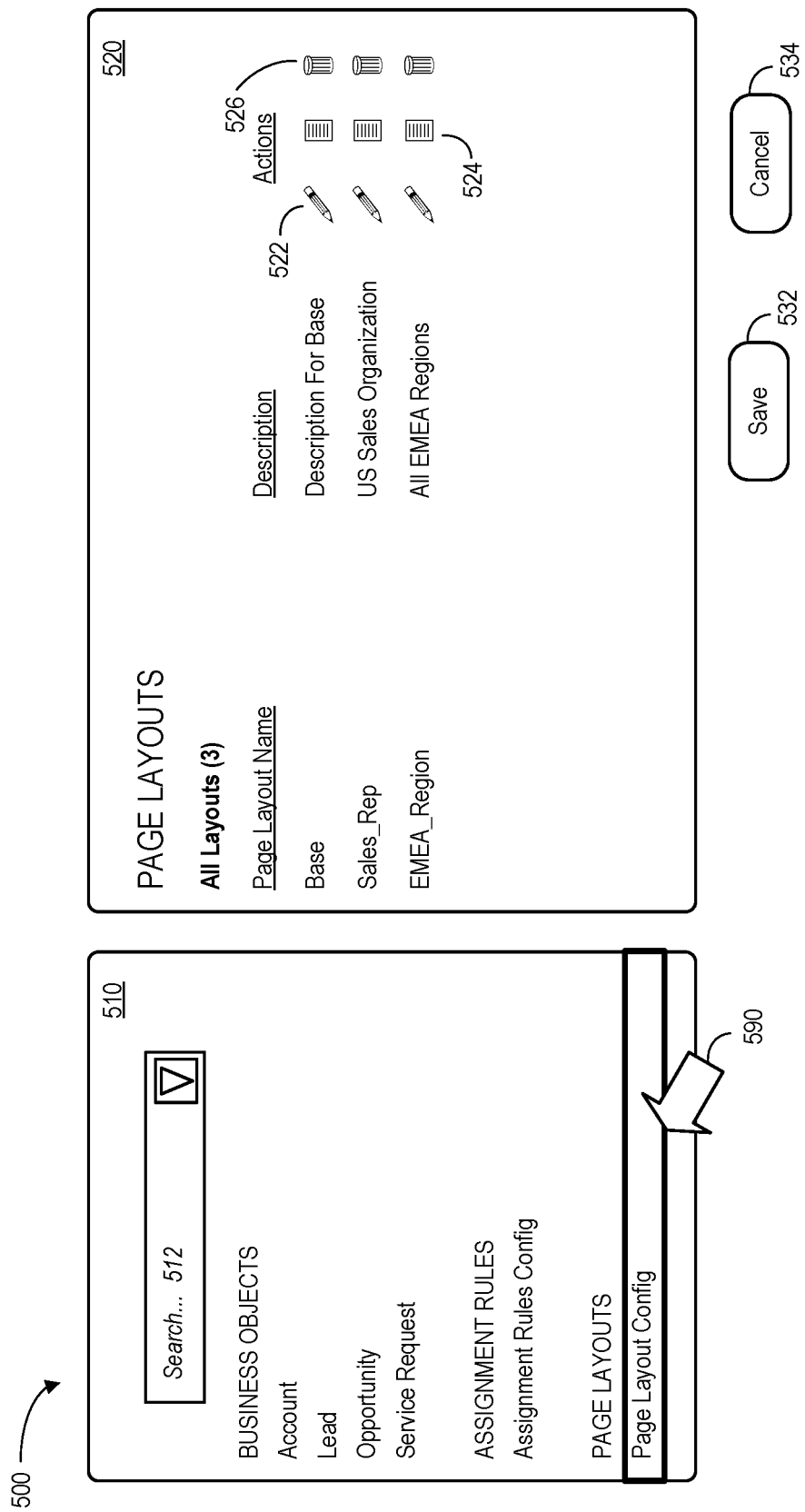
FIG. 5 is a change project creation UI in accordance with some embodiments.
Figure 6:
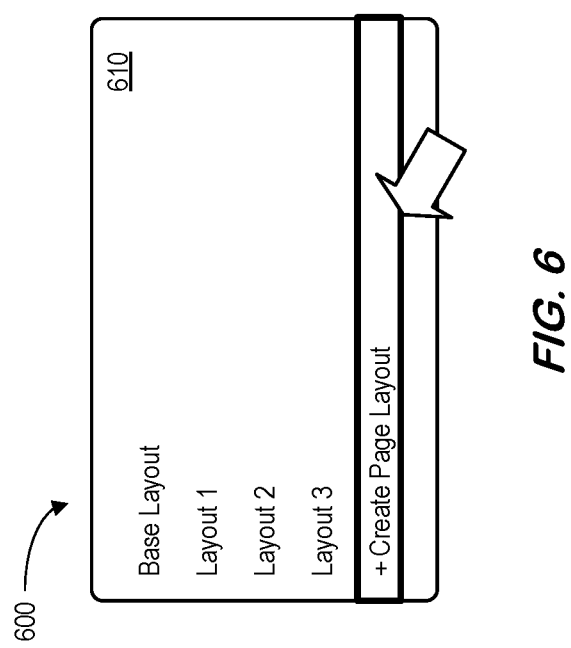
FIG. 6 is an adaptation creation UI according to some embodiments.

Users may be able to control the sequence or precedence of these page layouts using the precedence of assignment rules. In case of further conflicts, key users/admins can control the precedence of page layouts itself. This may help resolve conflicts when multiple page layouts apply. Moreover, assignment rules might be performed at user login (if there are just user parameters involved). In the case of an instance-based evaluation, the system may re-trigger evaluation whenever an involved instance value changes. In some embodiments, a designer might create page layouts via a change project as shown in the change project creation UI 500 shown in FIG. 5 in accordance with some embodiments. As before, the UI 500 includes a display 510 that can be used to select or search 512 business objects, assignment rules, page layouts, etc. Selection of assignment rules (e.g., via touch screen or computer mouse pointer 590) may result in another display 520 that lists all of the assignment rules, including the rule name, description, and actions that might be performed (e.g., to edit 522, add 524, or delete 526 a rule) along with options for the designer to "Save" 532 or "Cancel" 534 the changes. As another approach, FIG. 6 is an adaptation creation UI 600 according to some embodiments including a drop-down menu 610 that can be used to select "Create Page Layout."

Figure 7:
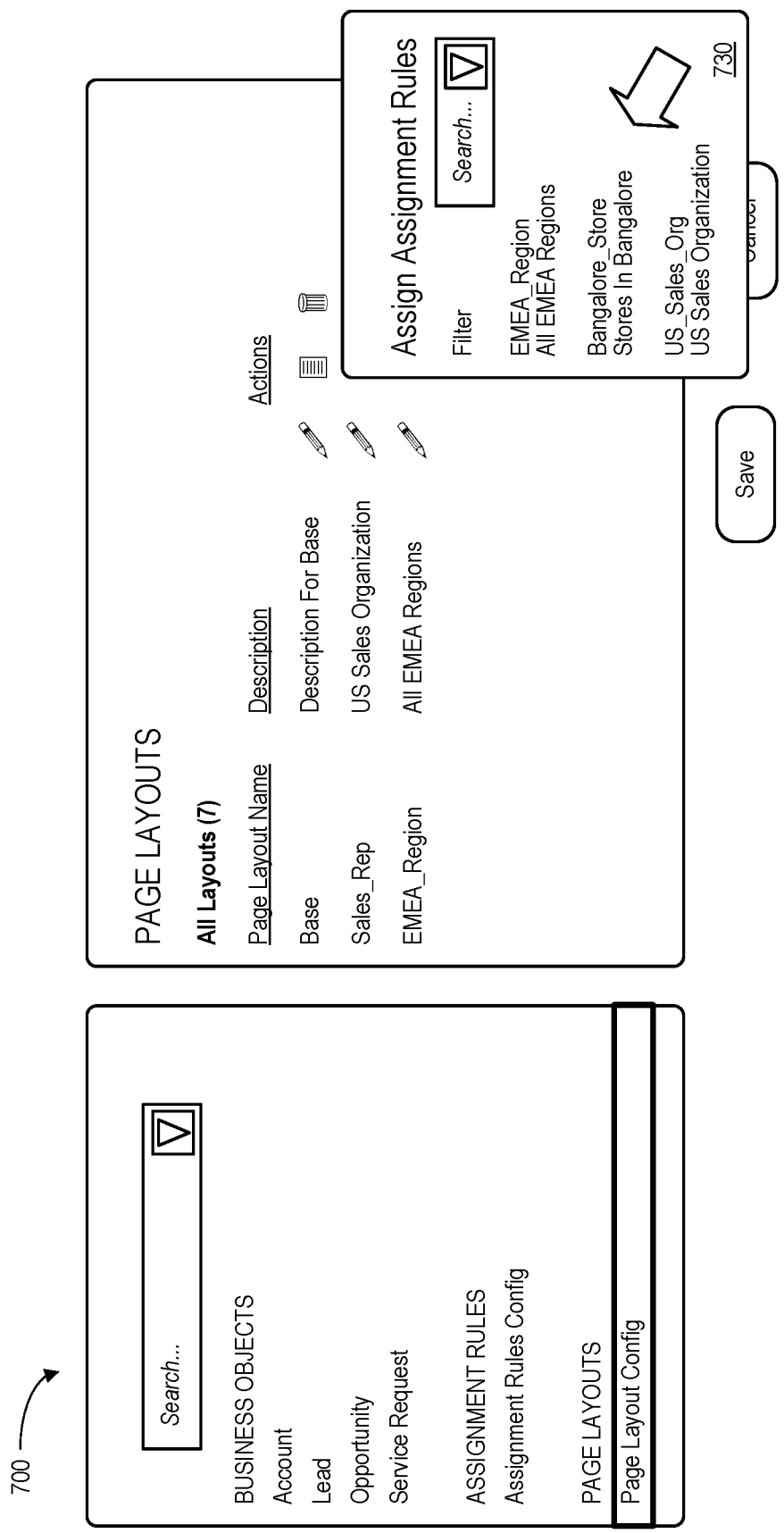
FIG. 7 is a page layout UI in accordance with some embodiments.

After the designer changes the layout, such as by adding or removing sections, fields, tabs, etc., the page payouts can be assigned to an assignment rule (via a change project or a shortcut via adaptation). FIG. 7 is a page layout UI 700 in accordance with some embodiments. The UI 700 lets the designer assign multiple assignment rules 730 to a single page layout. In some embodiments, the system may apply a Boolean "OR" condition when there are multiple assignment rules for a single page layout. If any of the one assignment rules are satisfied, the system may apply that page layout to the user. According to some embodiments, the designer may control the precedence and/or sequence of page layouts via a drag-and-drop in this UI.

Some embodiments may support "instance based" page layouts for specific scenarios, such as like a ticket UI. In this case, based on a ticket type (e.g., customer service, field service, etc.), the UI may be completely different. As a result, the layout modeling happens with respect to the specific entity (e.g., ticket type) and UI. If an instance based layout exists, the global (user based page layout) may be ignored.

Figure 8:
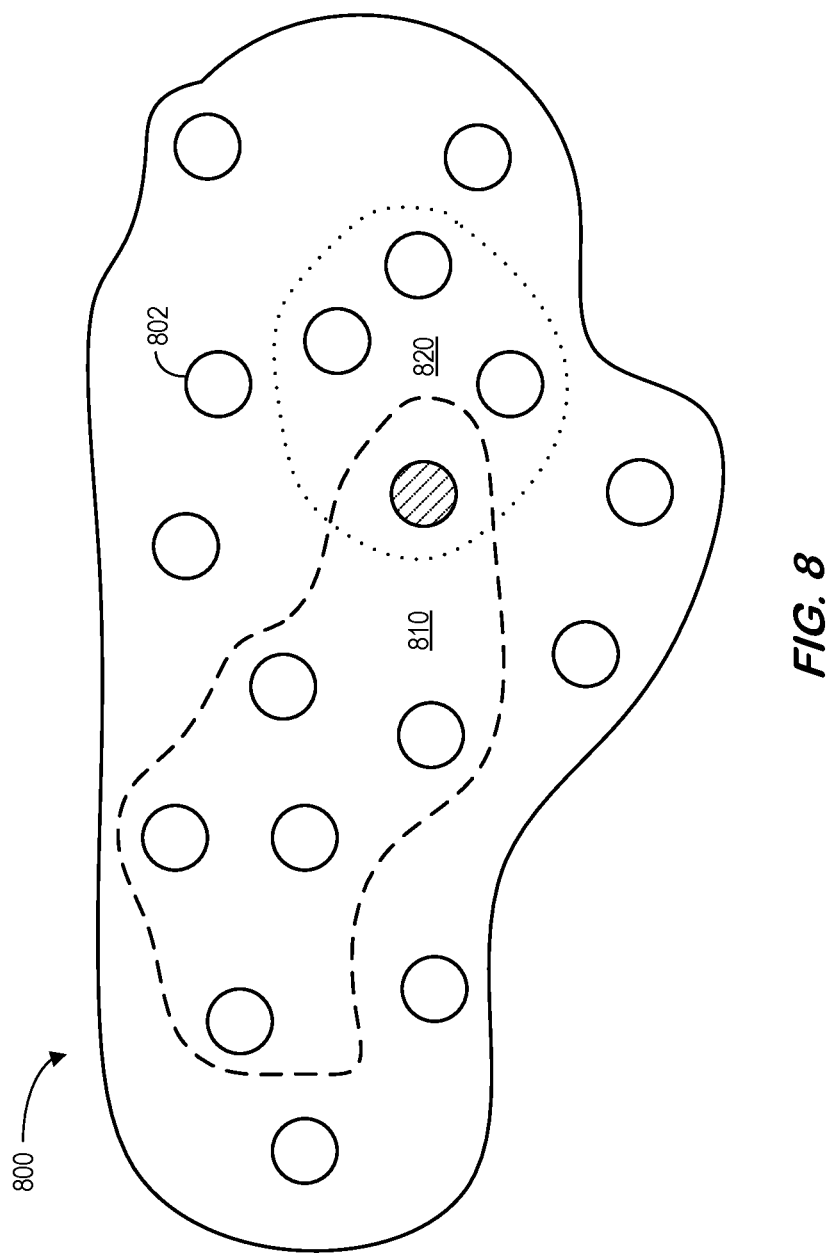
FIG. 8 illustrates users according to some embodiments.

With respect to page layouts, base layout merger, and potential conflicts, note that users and/or layouts may be grouped in various ways. For example, FIG. 8 illustrates 800 a set of users 802 according to some embodiments. The users 802 may be grouped into a first subset 810 (e.g., all users in Europe) and a second subset 820 (e.g., all users who speak Spanish). Moreover, a particular user 802 might be included in multiple subsets (e.g., as illustrated by crosshatching FIG. 8). According to some embodiments, base layout changes are applied to all users while page layout changes are applied only to the subset of users defined by assignment rules. Thus, some embodiments may incorporate merger and/or union logic. In the event of a conflict, page layout behavior may take precedence.

Conflicts may arise, for example, when changes are made to same control in both the base layout and the page layout. Consider a field that is made visible in the base layout but that same field is explicitly hidden in a page layout. In this case, the field may be eventually hidden because the page layout takes precedence. Similarly, a sequence of tabs in the base layout may be "A, B, C" but the sequence of tabs in the page layout is "C, B, A." In this case, the final result may eventually be determined to be "C, B, A" because the page layout has precedence over the base layout.

In the case of non-conflicting changes, both the base layout and page layout changes may be applied. For example, if a field is hidden (or made visible) in base layout but that same field attribute is not over-ridden in the page layout, the system may respect and use the base layout setting because there is no conflict. Embodiments could ignore base layout changes to keep things simple. That is, the system might just apply page layout changes and any new field addition would need to be done in each individual page layout (to make that field visible for all users). This could be a substantial task for key users—so embodiments may instead consider both base layout and individual page layout changes for unions and/or mergers. Note that some users might do most of the UI changes in base layout and do minor changes in page layouts—and other users will do the opposite: minor common changes in the base layout and major changes in page layouts. Hence, embodiments may provide same capabilities in both the base layout and page layout. Such an approach gives users a choice as to whether they want to make the base layout thick and page layout thin (or vice versa).

There may be an additional complexity of page layouts conflicts where a user has multiple unique page layouts assigned via roles. In this case, the system may need to merge them all along with base layout changes. This could lead to confusion because the final UI might look drastically different. To avoid this complexity, a user might have, at a maximum, one single page layout. One way to do this would be utilize automatic precedence selection. For example, the sequence or order of page layouts as it appears in the page layout display might control which layout takes precedence (and be adjustable via a drag-and-drop operation). Consider, for example, two different page layouts arranged as follows:

"Sales Manager," and

"Sales Representative."

If a user falls under both conditions (e.g., a sales manager who can also act as sales representative), the sales manager layout would be given precedence. Another approach would be to let a user choose which layout he or she wants to use. In this case, a user who can sometimes work in different personas may be given a choice upon login as to whether they want to select the layout/persona of "sales manager" or "sales representative." This selection can be made sticky near the shell (where they can switch from one role to the other). According to some embodiments, a user can select a default persona and/or the system may remember the user's previous choice. Embodiments may let the user decide if they want automatic layout selection or a manual selection and a central setting may control this behavior.

With respect to page layout creation and/or modification, a key user may first select (or create) a page layout or base layout before any UI customization. All of the UI customizations (e.g., show or hide fields, sections, mashups etc.) may be added to the selected layout and a layout may apply across pages.

With respect to the assignment of page layouts, the assignment might be assigned to users based on user attributes such as a user role and region (which can be referred to as assignment rules or user assignments or dynamic user groups). For a user, evaluation of all assignment rules will result in one single page layout (and no merging of the page layouts needed).

With respect to the base layout, changes may be applied to all derived page layouts with priority being given to the page layout (in the case of a conflict). Moreover, conflict resolution may be provided at the individual view level.

Embodiments may determine how to load a page layout for the end user. One option would be for a repository service to calculate the page layout for every request based on the logged in user. Another option would be for the assigned page layout to be determined separately (and the UI may request the selected page layout from a repository service). Embodiments may utilize the second option because it lets the UI metadata be cached on the client or proxies if needed. Note that in some embodiments, this metadata caching may not be implemented. The client caching is not possible with the first option, because in that case the response is completely dynamic (it does not depend on URL or query parameters). In addition, the second option may also extend easily for key-user adaptation.

Figure 9:
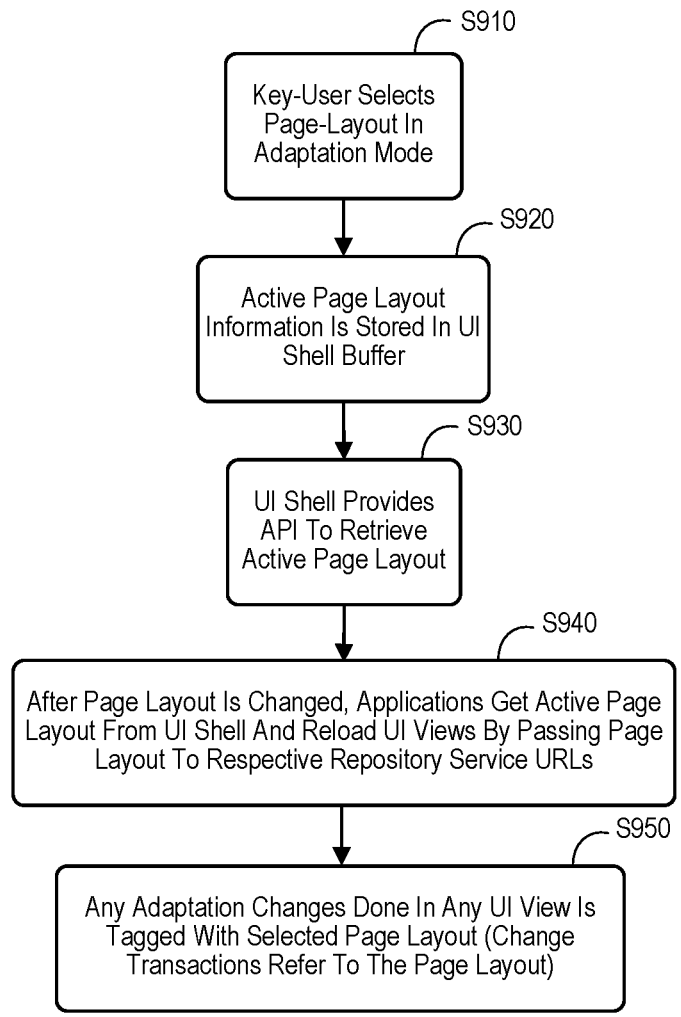
FIG. 9 is a page layout creation method accordance with some embodiments.

According to some embodiments, page layouts are created and maintained in an Extensibility administrator UI. For example, FIG. 9 is a page layout creation method accordance with some embodiments. At S910, page layout contents may be modified in the adaptation mode. At S920, a key-user selects a page-layout in the adaptation mode. The active page layout information is stored in a UI shell buffer at S930. At S940, the UI shell provides the API to retrieve the active page layout. Once the page layout is changed, applications may get the active page layout from the UI shell and reload the UI views by passing the page layout to the respective repository service URLs at S950. Any adaptation changes done in any UI view may be tagged with the selected page layout (with change transactions referring to the page layout).

Figure 10:
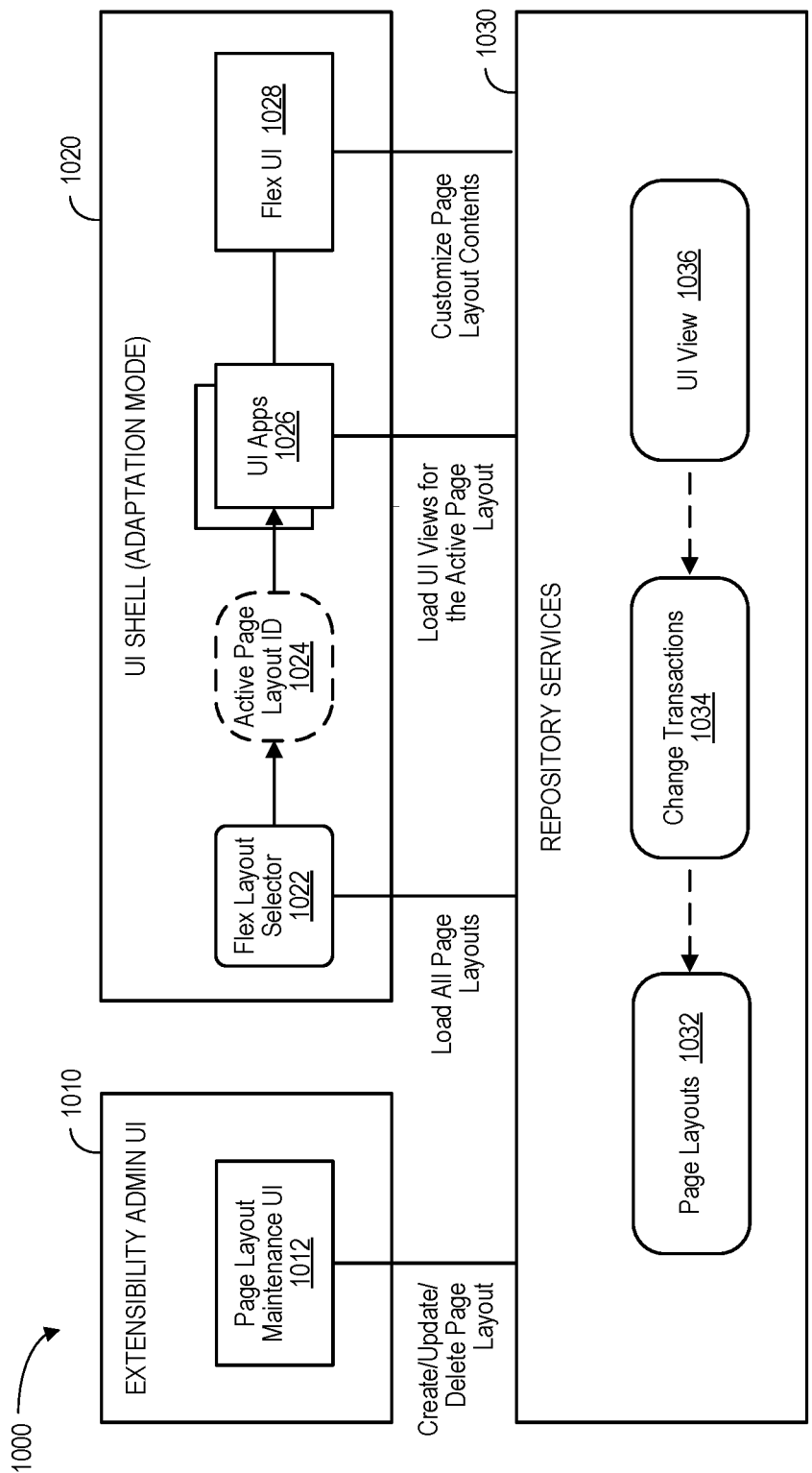
FIG. 10 is a page layout system according to some embodiments.

FIG. 10 is a page layout system 1000 according to some embodiments. An extensibility administrator UI 1010 may include a page layout maintenance UI 1012 to create, update, and/or deleted page layouts in repository services 1030. A UI shell 1020 (e.g., adaptation mode) may include a flex layout selector 1022 to load all pages and provide an active page layout identifier 1024 to UI applications 1026 (which, in turn, load UI views for the active page layout). Moreover, a flex UI 1028 may be associated with customized page layout contents. The repository services 1030 may include page layouts 1032, change transactions 1034, and/or a UI view 1036.

Figure 11:
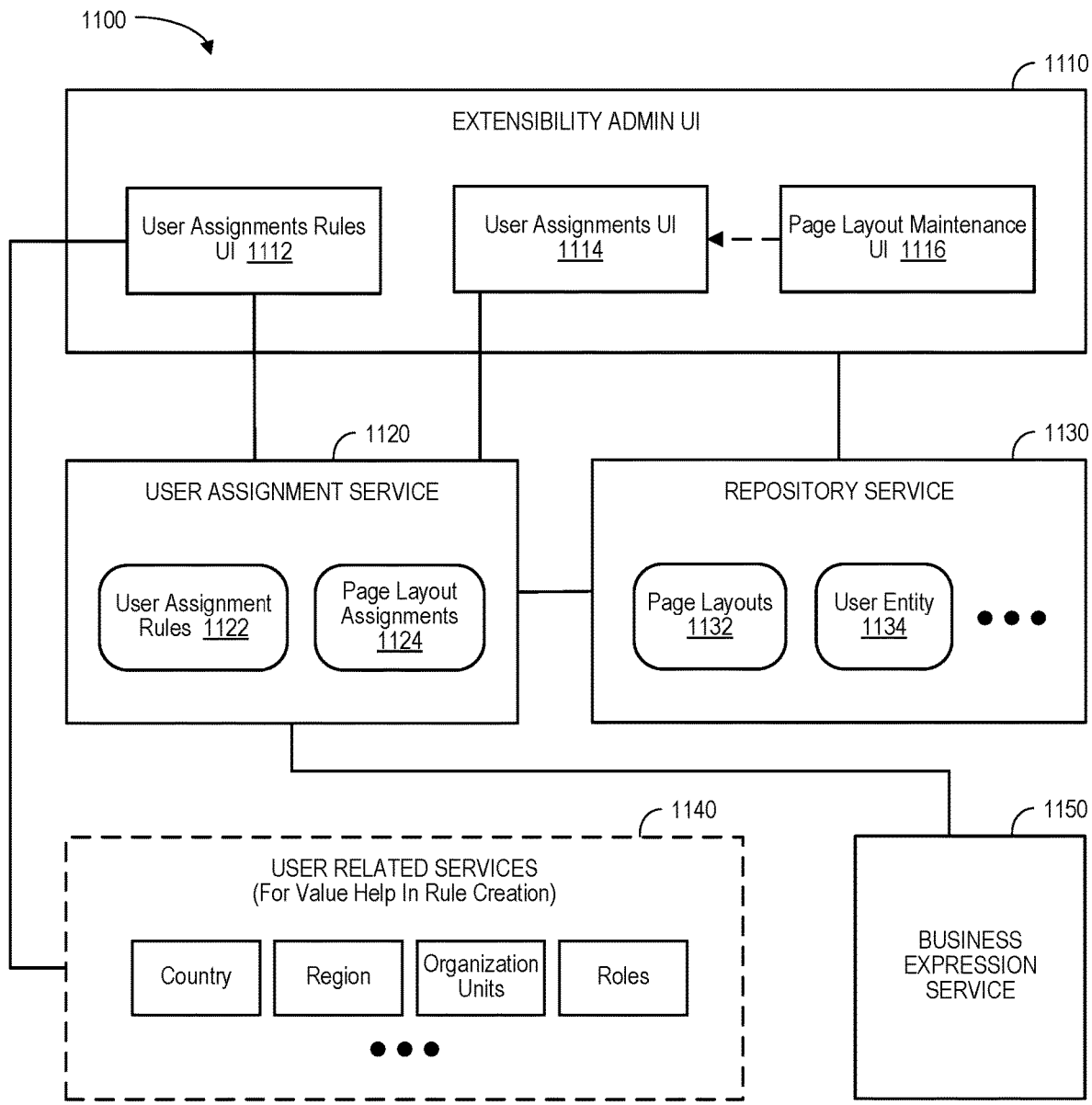
FIG. 11 is a page layout assignment system in accordance with some embodiments.

FIG. 11 is a page layout assignment system 1100 in accordance with some embodiments. The system includes an extensibility administrator UI 1110 with a user assignment rules UI 1112, a user assignments UI 1114, and a page layout maintenance UI 1116. The user assignment rules UI 1112 and user assignments UI 114 may exchange information with a user assignment service 1120 that includes user assignment rules 1122 and page layout assignments 1124 (and that interacts with a business expression service 1150). A repository service 1130 may include page layouts 1132, user entity 1134, etc. User related services 1140 (for value help in rule creation) might include country, region, organization unit, roles, etc.

In this way, the system 1100 may assign a page layout to the users by creating and assigning the user assignment rules 1122. A user assignment rule 1122 might, for example, contain a business expression that will be evaluated to a Boolean value (e.g., "true" or "false"). The anchor entity for the business expressions (in user assignment rules 1122) is the user entity 1134. The user entity 1134 contains information about roles, user preferences, and an aggregation or association to an employee entity. According to some embodiments, user assignment rules 1122 are attached to a layout (to be associated with a user).

Figure 12:
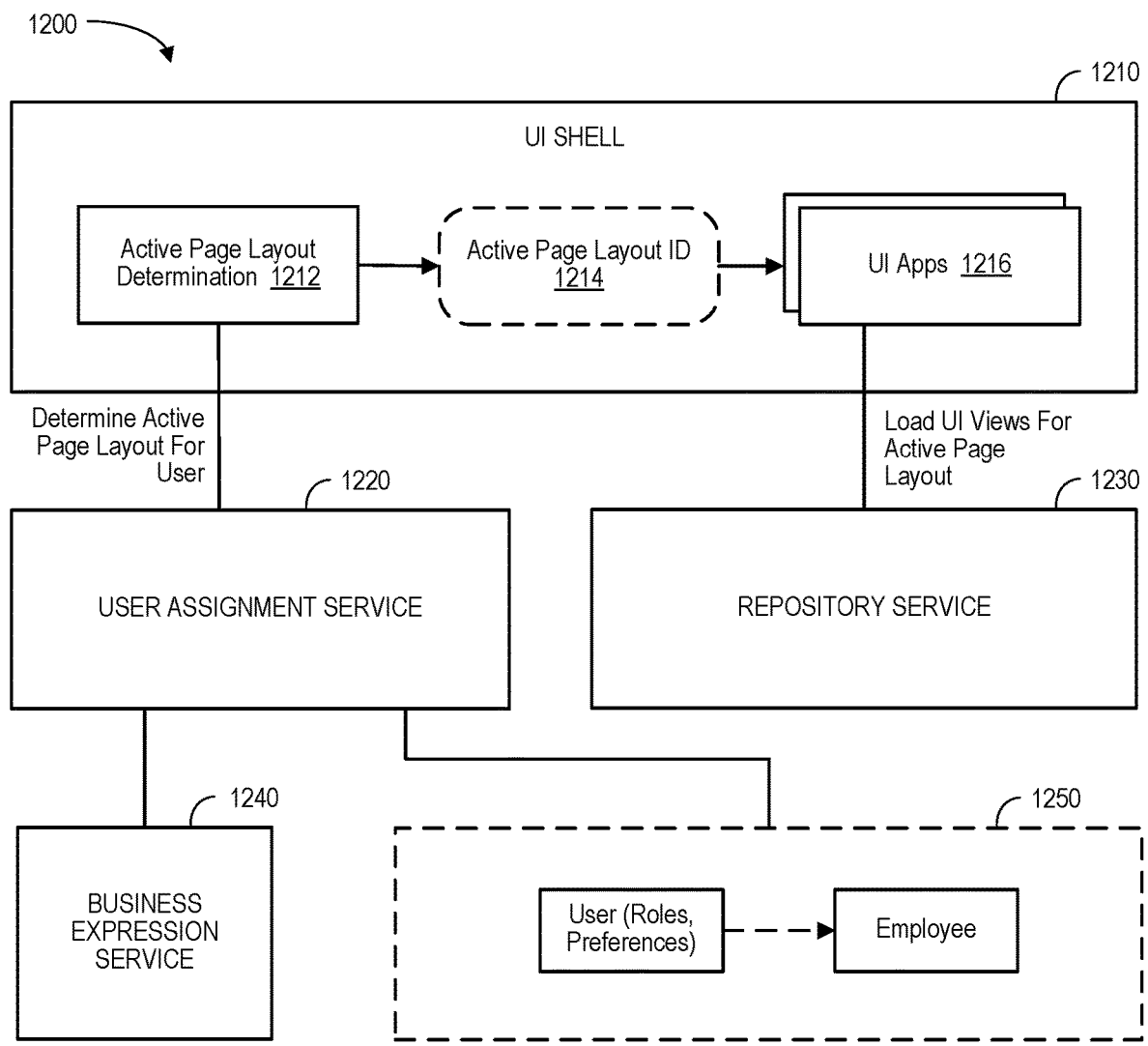
FIG. 12 is a page layout application to end user system according to some embodiments.

FIG. 12 is a page layout application to end user system 1200 according to some embodiments. A UI shell 1210 may include an active page layout determination 1212 that determines an active page layout for a user that is provided to a user assignment service 1220. The active page layout determination 1212 also transmits an active page layout identifier 1214 to UI applications 1216 that load UI views for the active page layout via a repository service 1230. The user assignment service 1220 may communication with a business expression service 1240 and user information 1250 (e.g., user roles and preferences, employee information, etc.). In this way, the system may initially determine the active page layout for the user. To determine the active page layout 1212, the UI shell 1210 makes a call to the user assignments service 1220. The user assignment service 1220 calculates the active page layout for the logged-in user by evaluating the assignment rules. The UI shell 1210 then stores the active page layout identifier 1214 in a buffer, and the UI applications 1216 request the active page layout from the UI shell 1210 and pass that data when retrieving any UI view from the repository service 1230.

Figure 13:
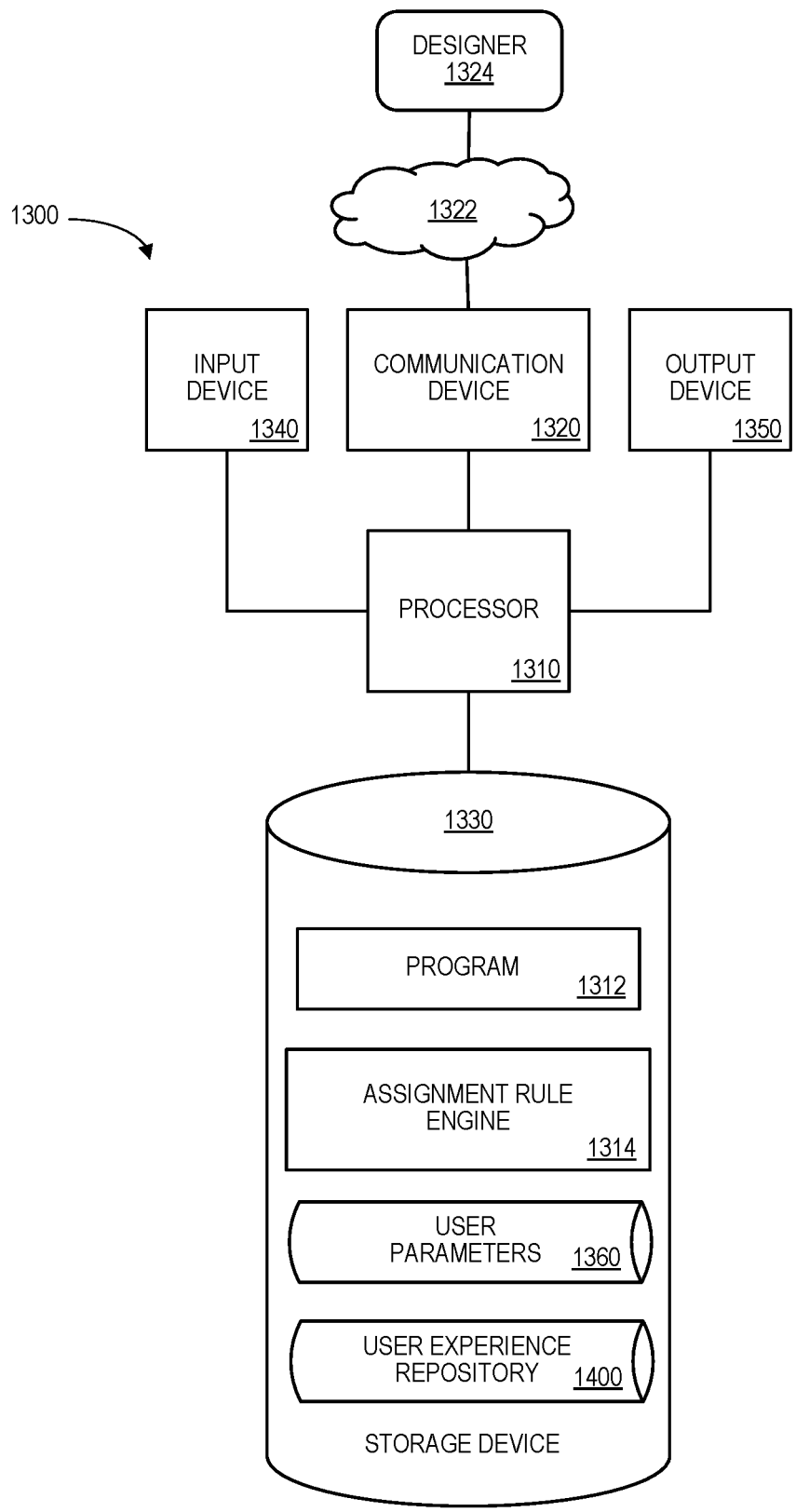
FIG. 13 is an apparatus or platform according to some embodiments.

Note that the embodiments described herein may be implemented using any number of different hardware configurations. For example, FIG. 13 is a block diagram of an apparatus or platform 1300 that may be, for example, associated with the system 100 of FIG. 1 (and/or any other system described herein). The platform 1300 comprises a processor 1310, such as one or more commercially available CPUs in the form of one-chip microprocessors, coupled to a communication device 1320 configured to communicate via a communication network (not shown in FIG. 13). The communication device 1320 may be used to communicate, for example, with one or more remote designer devices 1324 via a communication network 1322. The platform 1300 further includes an input device 1340 (e.g., a computer mouse and/or keyboard to input data about application systems or data sources) and an output device 1350 (e.g., a computer monitor) to render a display, transmit recommendations or alerts (e.g., a warning signal based on page layout determinations), and/or create monitoring reports). According to some embodiments, a mobile device and/or PC may be used to exchange data with the platform 1300.

The processor 1310 also communicates with a storage device 1330. The storage device 1330 can be implemented as a single database, or the different components of the storage device 1330 can be distributed using multiple databases (that is, different deployment data storage options are possible). The storage device 1330 may comprise any appropriate data storage device, including combinations of magnetic storage devices (e.g., a hard disk drive), optical storage devices, mobile telephones, and/or semiconductor memory devices. The storage device 1330 stores a program 1312 and/or an assignment rule engine 1314 for controlling the processor 1310. The processor 1310 performs instructions of the programs 1312, 1314, and thereby operates in accordance with any of the embodiments described herein. For example, the processor 1310 may receive, from a designer, an indication of a selected base layout for a selected application and interact with the designer to create a user experience variant (e.g., a page layout). The designer may then define an assignment rule for the user experience variant, the assignment rule including custom logic and multiple user parameters (e.g., a user role, country, language, etc.), and the processor 1310 may store information about the user experience variant and assignment rule. The processor 1310 may determine that a user is accessing the selected application and automatically evaluate the custom logic of the assignment rule based on user parameters of the user accessing the selected application. In accordance with the evaluation, the processor 1310 may arrange to provide the appropriate user experience variant to the user.

The programs 1312, 1314 may be stored in a compressed, uncompiled and/or encrypted format. The programs 1312, 1314 may furthermore include other program elements, such as an operating system, clipboard application, a database management system, and/or device drivers used by the processor 1310 to interface with peripheral devices.

As used herein, data may be "received" by or "transmitted" to, for example: (i) the platform 1300 from another device; or (ii) a software application or module within the platform 1300 from another software application, module, or any other source.

In some embodiments (such as the one shown in FIG. 13), the storage device 1330 further stores user parameters 1360 (e.g., containing a user role, region, language, territory, etc.) and a user experience repository 1400. An example of a database that may be used in connection with the platform 1300 will now be described in detail with respect to FIG. 14. Note that the database described herein is only one example, and additional and/or different data may be stored therein. Moreover, various databases might be split or combined in accordance with any of the embodiments described herein.

Figure 14:
FIG. 14 illustrates a user experience repository in accordance with some embodiments.

Referring to FIG. 14, a table is shown that represents the user experience repository 1400 that may be stored at the platform 1300 according to some embodiments. The table may include, for example, entries identifying page layouts and similar user experiences in connection with a cloud computing environment. The table may also define fields 1402, 1404, 1406, 1408, 1410 for each of the entries. The fields 1402, 1404, 1406, 1408, 1410 may, according to some embodiments, specify: a user experience identifier 1402, an application 1404, a user experience type 1406, one or more assignment rules 1408, and applicable user parameters 1410. The user experience repository 1400 may be created and updated, for example, when a new application is added, when a new variant is created, etc.

The user experience identifier 1402 might be a unique alphanumeric label or link that is associated with a page layout or similar item for the application 1404. The user experience type 1406 might indicate the type of user experience item being defined (e.g., an artifact, a field attribute, a UI icon, etc.). The assignment rules 1408 may contain or link to logic that defines which users should receive which user experience elements. The applicable user parameters 1410 may indicate, for example, that the custom logic is based on a user role, a user name, an enterprise department, a country, a region, a language, an organization hierarchy, an instance, etc.

Figure 15:
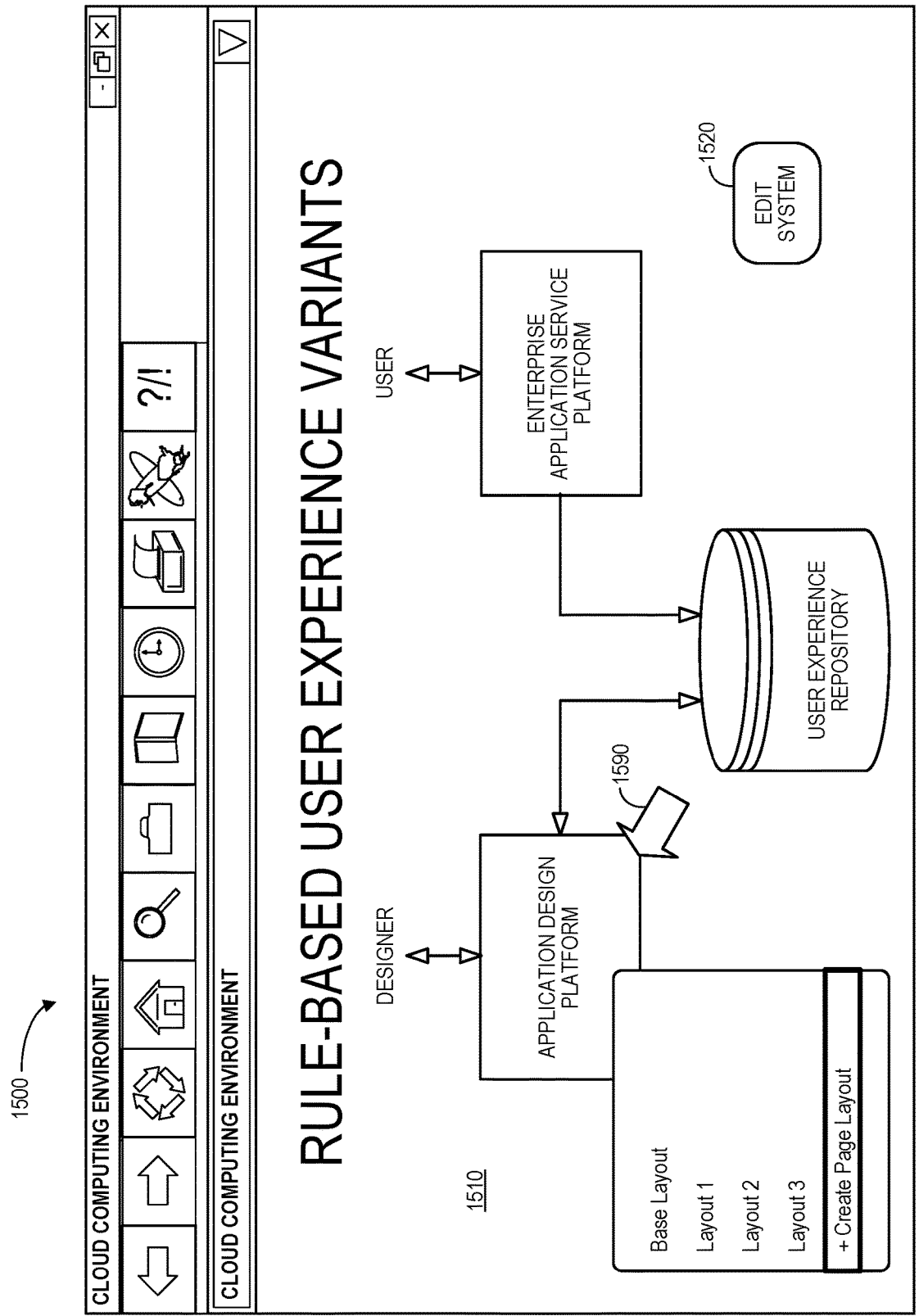
FIG. 15 is a human machine interface display in accordance with some embodiments.

FIG. 15 is a human machine interface display 1500 in accordance with some embodiments. The display 1500 includes a graphical representation 1510 or dashboard that might be used to manage or monitor a rule-based user experience variant system (e.g., associated with a cloud provider). In particular, selection of an element (e.g., via a touchscreen or computer mouse pointer 1590) might result in the display of a popup window that contains configuration data. The display 1500 may also include a user selectable "Edit System" icon 1520 to request system changes (e.g., to investigate or improve system performance or mappings).

Thus, embodiments may let multiple user parameters such as country, geography, language, etc. be used to select a variant in addition to a user role. In fact, embodiments may use a mix of all of these parameters by the way assignment rules. This approach may reduce lot of unnecessary roles just created for page layouts. Moreover, embodiments may allow for the existence of multiple base page layouts. Previously, all UI screen variants determinations and merging happened on the client which resulted in flickering and slow rendering. In the current approach, the assignment rules are calculated in the backend (and the results also cached)—the page layout is picked based on that without any merging of layouts. Embodiments may even work for a micro-front approach (whereas earlier approaches emphasized the entire screen).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 16:
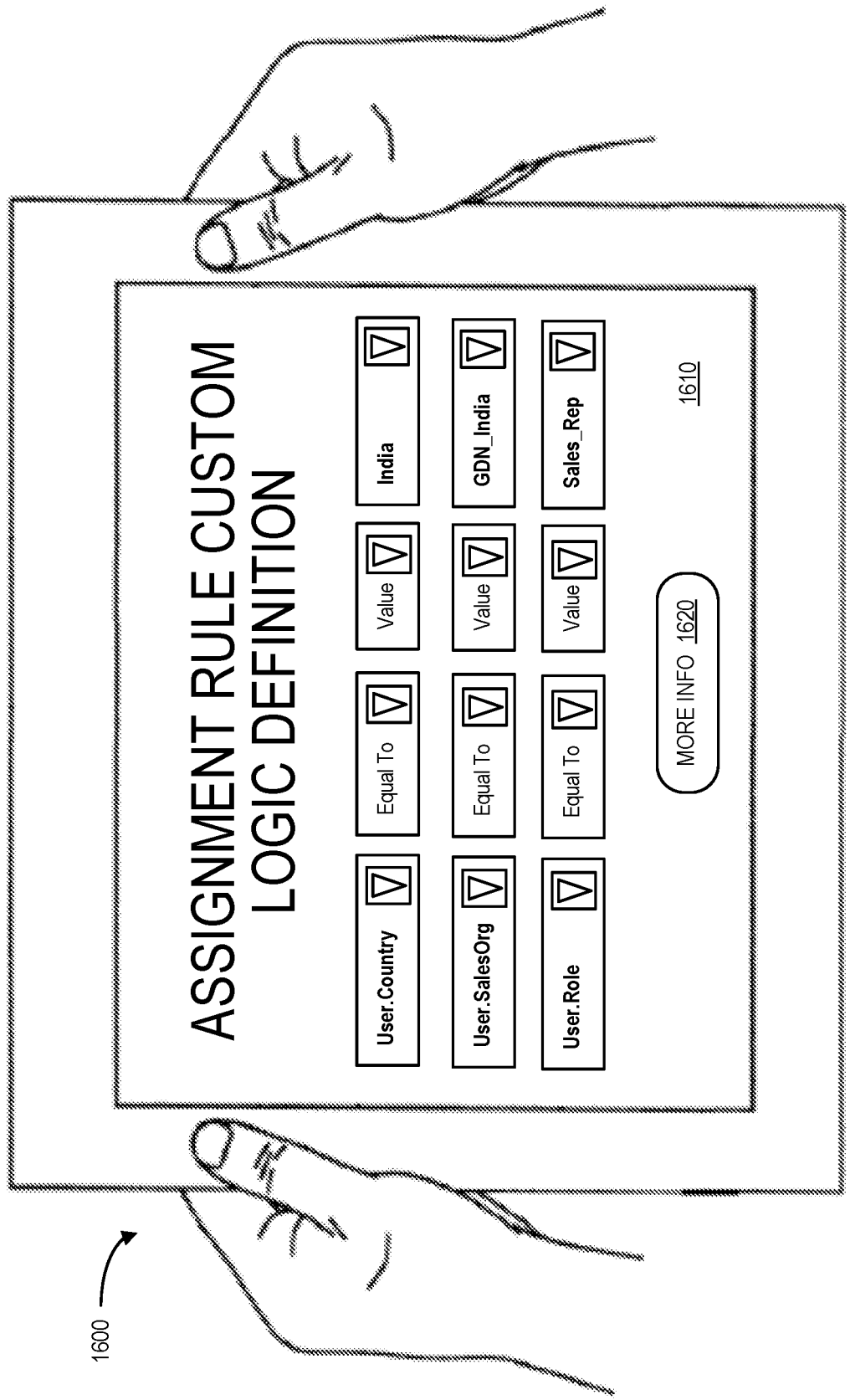
FIG. 16 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of user experiences, any of the embodiments described herein could be applied to other types of user experiences. Moreover, the displays shown herein are provided only as examples, and any other type of user interface could be implemented. For example, FIG. 16 shows a handheld tablet computer 1600 rendering an assignment rule custom logic definition display 1610 that may be used to view or adjust assignment rules for page layouts and similar elements and/or to request additional data (e.g., via a "More Info" icon 1620).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to support multi-parameter, rule-based user experience variants for cloud application services, comprising:
   a user experience repository containing base layouts and variant metadata for applications of an enterprise;
   an application design platform coupled to the user experience repository and including:
      a computer processor, and
      a memory storage device, coupled to the computer processor, including instructions that, when executed by the computer processor, enable the application design platform to:
         receive, from a designer, an indication of a selected base layout for a selected application,
         interact with the designer to create a user experience variant of the selected base layout,
         define, based on information received from the designer, an assignment rule for the user experience variant, the assignment rule including custom logic and multiple user parameters, and
         store information about the user experience variant and assignment rule; and
   an enterprise application service platform coupled to the user experience repository to:
      determine that a user is accessing the selected application,
      automatically evaluate the custom logic of the assignment rule for the selected application based on user parameters of the user accessing the selected application, and
      in accordance with the evaluation, arrange to provide the appropriate user experience variant to the user, wherein:
         if there is no conflict between a prior change to the selected base layout and a prior change to the user experience variant of the selected base layout, automatically provide the user with the prior change to the selected base layout, and
         if there is a conflict between a prior change to the selected base layout and a prior change to the user experience variant of the selected base layout, automatically provide the user with the prior change to the user experience variant.

2. The system of claim 1, wherein the user experience variant is associated with at least one of: (i) a page layout, (ii) an artifact, (iii) a field attribute, and (iv) a UI icon.

3. The system of claim 1, wherein the multiple user parameters include at least one of: (i) a user role, (ii) a user name, (iii) an enterprise department, (iv) a country, (v) a region, (vi) a language, (vii) an organization hierarchy, and (viii) an instance.

4. The system of claim 1, wherein multiple user experience variants are associated with the base layout for the selected application.

5. The system of claim 1, wherein multiple assignment rules are assigned to the user experience variant.

6. The system of claim 5, wherein the designer selects precedence of the multiple assignment rules.

7. The system of claim 5, wherein a user experience variant conflict is resolved based on an automatic precedence.

8. The system of claim 5, wherein a user experience variant conflict is resolved based on a user selection.

9. A computer-implemented method to support multi-parameter, rule-based user experience variants for cloud application services, comprising:
   receiving, by a computer processor of an application design platform from a designer, an indication of a selected base layout for a selected application in a user experience repository that contains base layouts and variant metadata for applications of an enterprise;
   interacting with the designer to create a user experience variant of the selected base layout;
   defining, based on information received from the designer, an assignment rule for the user experience variant, the assignment rule including custom logic and multiple user parameters;
   storing information about the user experience variant and assignment rule;
   determining, by an enterprise application service platform, that a user is accessing the selected application;
   automatically evaluating the custom logic of the assignment rule for the selected application based on user parameters of the user accessing the selected application; and
   in accordance with the evaluation, arranging to provide the appropriate user experience variant to the user, wherein:
      if there is no conflict between a prior change to the selected base layout and a prior change to the user experience variant of the selected base layout, automatically provide the user with the prior change to the selected base layout, and
      if there is a conflict between a prior change to the selected base layout and a prior change to the user experience variant of the selected base layout, automatically provide the user with the prior change to the user experience variant.

10. The method of claim 9, wherein the user experience variant is associated with at least one of: (i) a page layout, (ii) an artifact, (iii) a field attribute, and (iv) a UI icon.

11. The method of claim 9, wherein the multiple user parameters include at least one of: (i) a user role, (ii) a user name, (iii) an enterprise department, (iv) a country, (v) a region, (vi) a language, (vii) an organization hierarchy, and (viii) an instance.

12. The method of claim 9, wherein multiple user experience variants are associated with the base layout for the selected application.

13. The method of claim 9, wherein multiple assignment rules are assigned to the user experience variant.

14. The method of claim 13, wherein the designer selects precedence of the multiple assignment rules.

15. The method of claim 13, wherein a user experience variant conflict is resolved based on an automatic precedence.

16. The method of claim 13, wherein a user experience variant conflict is resolved based on a user selection.

17. A non-transitory, computer readable medium having executable instructions stored therein to perform a method to support multi-parameter, rule-based user experience variants for cloud application services, the method comprising:
   receiving, by a computer processor of an application design platform from a designer, an indication of a selected base layout for a selected application in a user experience repository that contains base layouts and variant metadata for applications of an enterprise;

interacting with the designer to create a user experience variant of the selected base layout;

defining, based on information received from the designer, an assignment rule for the user experience variant, the assignment rule including custom logic and multiple user parameters;

storing information about the user experience variant and assignment rule;

determining, by an enterprise application service platform, that a user is accessing the selected application;

automatically evaluating the custom logic of the assignment rule for the selected application based on user parameters of the user accessing the selected application; and in accordance with the evaluation, arranging to provide the appropriate user experience variant to the user, wherein:

if there is no conflict between a prior change to the selected base layout and a prior change to the user experience variant of the selected base layout, automatically provide the user with the prior change to the selected base layout, and if there is a conflict between a prior change to the selected base layout and a prior change to the user experience variant of the selected base layout, automatically provide the user with the prior change to the user experience variant.

18. The medium of claim 17, wherein the user experience variant is associated with at least one of: (i) a page layout, (ii) an artifact, (iii) a field attribute, and (iv) a UI icon.

19. The medium of claim 17, wherein the multiple user parameters include at least one of: (i) a user role, (ii) a user name, (iii) an enterprise department, (iv) a country, (v) a region, (vi) a language, (vii) an organization hierarchy, and (viii) an instance.

20. The medium of claim 17, wherein multiple user experience variants are associated with the base layout for the selected application.

21. The medium of claim 17, wherein multiple assignment rules are assigned to the user experience variant.

* * * * *